(12) United States Patent
Perks et al.

(10) Patent No.: US 7,351,440 B2
(45) Date of Patent: Apr. 1, 2008

(54) WHIPPABLE FOOD PRODUCT WITH IMPROVED STABILITY

(75) Inventors: Cheryl Perks, Ridgeway (CA); Michael Piatko, West Seneca, NY (US); Thomas Aurand, Orchard Park, NY (US)

(73) Assignee: Rich Products Corporation, Buffalo, NY (US)

( * ) Notice: Subject to any disclaimer, the term of this patent is extended or adjusted under 35 U.S.C. 154(b) by 0 days.

(21) Appl. No.: 10/843,926

(22) Filed: May 12, 2004

(65) Prior Publication Data

US 2004/0265468 A1 Dec. 30, 2004

Related U.S. Application Data

(60) Provisional application No. 60/470,558, filed on May 14, 2003.

(51) Int. Cl.
*A23L 1/035* (2006.01)
(52) U.S. Cl. ...................... 426/564; 426/602
(58) Field of Classification Search ................ 426/564, 426/565
See application file for complete search history.

(56) References Cited

U.S. PATENT DOCUMENTS

| | | | |
|---|---|---|---|
| 2,970,918 A | 2/1961 | Petersen | |
| 3,510,316 A | 5/1970 | Decker | |
| 3,843,805 A | 10/1974 | Powell | |
| 3,922,361 A | 11/1975 | Vann | |
| 3,935,325 A | 1/1976 | Gilmore et al. | |
| 3,968,267 A | 7/1976 | Ogasa et al. | |
| 4,107,343 A | 8/1978 | Petricca | |
| 4,110,476 A | 8/1978 | Rhodes | |
| 4,146,652 A | 3/1979 | Kahn et al. | |
| 4,208,444 A | 6/1980 | Gilmore et al. | |
| 4,308,287 A | 12/1981 | Kahn et al. | |
| 4,353,932 A | 10/1982 | Bone | |
| 4,360,535 A | 11/1982 | Darling et al. | |
| 4,434,186 A | 2/1984 | Desia et al. | |
| 4,435,439 A | 3/1984 | Morris | |
| 4,461,777 A | 7/1984 | Murase et al. | |
| 4,497,841 A | 2/1985 | Wudel et al. | |
| 4,511,590 A | 4/1985 | Caldwell | |
| 4,552,773 A | 11/1985 | Kahn et al. | |
| 4,609,561 A | 9/1986 | Wade et al. | |
| 4,626,441 A | 12/1986 | Wolkstein | |
| 4,631,196 A | 12/1986 | Zeller | |
| 4,637,937 A | 1/1987 | Terada et al. | |
| 4,744,992 A | 5/1988 | Mitchell et al. | |
| 4,748,033 A | 5/1988 | Syfert et al. | |
| 4,770,892 A | 9/1988 | Grealy et al. | |
| 4,840,813 A | 6/1989 | Greenberg et al. | |
| 4,853,243 A | 8/1989 | Kahn et al. | |
| 4,888,194 A | 12/1989 | Andersen et al. | |
| 4,971,826 A | 11/1990 | Kato et al. | |
| 5,069,924 A | 12/1991 | Baccus, Jr. | |
| 5,077,075 A | 12/1991 | Wade | |
| 5,077,076 A | 12/1991 | Gonsalves et al. | |
| 5,149,557 A | 9/1992 | Morrison et al. | |
| 5,171,602 A | 12/1992 | Martin et al. | |
| 5,190,781 A | 3/1993 | Van Heteren et al. | |
| 5,246,725 A | 9/1993 | Fisher et al. | |
| 5,290,581 A | 3/1994 | Campbell et al. | |
| 5,336,514 A | 8/1994 | Jones et al. | |
| 5,358,728 A | 10/1994 | Martin et al. | |
| 5,366,751 A | 11/1994 | Pordy | |
| 5,478,587 A | 12/1995 | Mingione | |
| 5,486,372 A | 1/1996 | Martin et al. | |
| 5,609,904 A | 3/1997 | Koh et al. | |
| 5,690,986 A | 11/1997 | Okutomi et al. | |
| 5,759,609 A | 6/1998 | Lynch | |
| 5,958,476 A | 9/1999 | Cain et al. | |
| 5,962,058 A | 10/1999 | Ono et al. | |
| 5,980,869 A | 11/1999 | Sanker et al. | |
| 6,033,711 A | 3/2000 | Gonsalves et al. | |
| 6,117,473 A | 9/2000 | Leshik et al. | |
| 6,139,895 A | 10/2000 | Zablocki et al. | |
| 6,139,896 A | 10/2000 | Daenzer-Alloncle et al. | |
| 6,180,159 B1 | 1/2001 | Villagran et al. | |
| 6,203,841 B1 | 3/2001 | Lynch et al. | |
| 6,228,417 B1 | 5/2001 | Hidaka et al. | |

(Continued)

FOREIGN PATENT DOCUMENTS

DE  201 21 027 U1  12/2001

(Continued)

OTHER PUBLICATIONS

Van Putte, et al., *Fully Automated Determination of Solid Fat Content*, Journal of the American Oil Chemists' Society, Jul. 1974, vol. 51, pp. 316-320.

(Continued)

*Primary Examiner*—Carolyn Paden
(74) *Attorney, Agent, or Firm*—Hodgson Russ LLP

(57) ABSTRACT

A whippable food product having improved stability characteristics without detectable change in the organoleptic characteristics is provided. The product comprises triglyceride fat, one or more sugars and an emulsifier component comprising destabilizing and stabilizing emulsifiers in amounts sufficient to stabilize the product. This product can be stored at ambient temperatures for extended periods of time and can also be whipped and displayed at ambient temperatures.

18 Claims, No Drawings

U.S. PATENT DOCUMENTS

| | | |
|---|---|---|
| 6,468,576 B1 | 10/2002 | Sher et al. |
| 6,551,646 B1 | 4/2003 | Baker |
| 6,569,485 B2 | 5/2003 | Hussein |
| 6,649,207 B2 | 11/2003 | Coote et al. |
| 6,824,810 B2 | 11/2004 | Sargent et al. |
| 2002/0197371 A1 | 12/2002 | Lee et al. |
| 2002/0197376 A1 | 12/2002 | Broz |

FOREIGN PATENT DOCUMENTS

| | | |
|---|---|---|
| DE | 201 21 027 | 7/2002 |
| EP | 0 268 097 A1 | 5/1988 |
| EP | 0 737 425 A1 | 10/1996 |
| EP | 0 868 850 A1 | 7/1998 |
| EP | 1 210 880 A1 | 5/2002 |
| GB | 1 232 640 | 5/1971 |
| GB | 1232640 | 5/1971 |
| GB | 1252264 | 11/1971 |
| GB | 2 014 426 A | 8/1979 |
| GB | 2 027 447 A | 2/1980 |
| GB | 2 130 070 A | 5/1984 |
| JP | 61212273 | 9/1986 |
| JP | 63279752 | 11/1988 |
| WO | WO 94/14338 | 7/1994 |
| WO | WO- 94/21138 | 9/1994 |
| WO | WO 95/21535 | 8/1995 |
| WO | WO-96/37120 | 11/1996 |
| WO | WO- 97/33813 | 9/1997 |
| WO | WO- 97/43913 | 11/1997 |
| WO | WO 01/41586 | 6/2001 |
| WO | WO- 02/085130 A1 | 10/2002 |

OTHER PUBLICATIONS

HTTP:HANANPRODUCTS.COM, Tres Leches Traditional Latin Dessert Mix Specification Sheet, Oct. 10, 2002, pp. 1-5.

Shamsi, et al.; A Comparative Study of Dairy Whipping Cream and Palm Oil-Based Whipping Cream in Terms of FA Composition and Foam Stability; Journal of the American Oil Chemists' Society, vol. 79, No. 6, 2002; pp. 583-588; XP-002421502.

WHIPPABLE FOOD PRODUCT WITH IMPROVED STABILITY

This application claims priority to U.S. provisional application No. 60/470,558 filed on May 14, 2003, the disclosure of which is incorporated herein by reference.

FIELD OF THE INVENTION

The present invention relates generally to the field of whippable food products and more particularly to a whippable food product having improved performance and stability characteristics at ambient temperatures.

DISCUSSION OF RELATED ART

Whippable food products are commonly used as toppings, icings, fillings and the like for cakes and other desserts. Different approaches have been used to obtain formulations that possess desirable characteristics including longer shelf life of both unwhipped and whipped products, ease of preparation and use of the whipped product, stability and performance characteristics; the conditions under which whipping can be performed including the whipping temperature; display temperature and display time; and the ease of spreading of the whipped product etc.

Consumer selection of whippable products also depends upon the mouthfeel and taste of the whipped product, and stability indicators such as tendency for hardening, weeping, crazing, bleeding, cracking, sliding or melting off a dessert. Desirable characteristics include a fresh creamy taste with rich smooth appearance, and a lack of off-flavors and odors associated with many vegetable oils and fractions thereof and lack of a lingering or waxy taste.

It has been suggested that selection of emulsifiers, stabilizers, water-soluble solids including sweeteners and inorganic salts, proteins and fats is key to the preparation of such whippable products that possess the desired characteristics and at the same time appeal to the consumer. However, identification of specific combinations of these ingredients has proven to be elusive. Moreover, while stabilizer and destabilizer emulsifiers have been used previously, there has been no identification of the specific ratios of stabilizer to destabilizer emulsifiers so as to optimize their combined function for performance and stability.

In one approach, a triglyceride fat such as "temperate latitude" or "domestic" oil is used. Such oils include soybean oil, canola oil, sunflower oil, corn oil, cottonseed oil, olive oil, peanut oil, rapeseed oil, safflower oil, low linolenic soybean oil, low linolenic canola oil, high oleic sunflower oil, or one or more fractions thereof. Such oils are characterized generally as containing no more than about 5% fatty acids that are of C14 length or less; generally no more than about 15% C16 length fatty acid; and more than about 50% combined of C18 (saturated, mono, di and tri-unsaturated) fatty acid. Such triglyceride fats are recognized to have certain advantageous features including ready availability, appropriate solid fat index, and neutral flavor. However, such oils are recognized to require substantial hydrogenation when used in whipped products. In this regard, it is generally recognized that such domestic oils must be hydrogenated to a resultant iodine value of about 65 to about 75 in order to be useful in the formulation of a stable whip topping, icing or filling.

In general, such oils, if not further refined at substantial cost, are recognized as having (1) off-odors uncharacteristic of a dairy topping and (2) the presence therein following hydrogenation of a sufficient concentration of high molecular weight-saturated fat (stearic acid, C18:0, has a melting point of about 158° F.) that they leave a waxy aftertaste in the mouth that coats, but does not easily clear from the palate following tasting thereof.

An alternate approach to the provision of suitable combinations of triglyceride fat component and emulsifier involves the use of the "high lauric" or tropical oils, as they are known in the art, and that are perceived by consumers to have very desirable cream or butter-like organoleptic properties. Such oils (including hydrogenated forms, fractions or interesterified forms thereof) have, typically, very high degrees of saturation, and yet surprisingly low melting points owing to the high contribution to average molecular weight of the triglyceride therein made by the short length C14, C12, and lower carbon fatty acids.

Representative of such good organoleptic oils are babassu oil, coconut oil, tucum oil, palm kernel oil, and any combinations of the above. Inclusion of such oils (including hydrogenated forms or fractions thereof such as partially hydrogenated palm kernel oil, fully hydrogenated palm kernel oil (meaning to an iodine value of about 1), palm kernel stearine or olein fractions partially hydrogenated coconut oil, fully hydrogenated coconut oil or combinations of any thereof) in the triglyceride fat component of whippable products are recognized to facilitate whippability (including continuous whippability) and to promote stability and presence of desirable organoleptic properties (organoleptic perception) in such products and confections.

Generally, however, such triglyceride fats by themselves do not provide enhanced temperature stability, a desirable feature for contemporary products. When appropriately hydrogenated, they provide improved temperature stability, however; they also contribute to undesirable performance or consumer appeal characteristics, such as, waxy mouth feel, poor getaway, etc.

In addition to the types and blends of fats, emulsifiers have specific roles in topping applications. In the liquid phase stabilizing surfactants are needed to prevent creaming and inversion. When the product is prepared (whipped), destabilizing surfactants are needed to displace the protein from the oil globule and allow a stable foam/topping to be formed from an oil in water emulsion. Accordingly the right proportion is critical to a stable final product.

A variety of emulsifiers have been used in combination with these oils including certain amounts of (and combinations of) Polysorbate 60, hex glycerol distearate, lecithin's, and also sodium or calcium stearoyl lactylate, esterified monoglycerides, diglycerides, sucrose esters, polyethylene glycols (PEGs), polyglycol esters (PGEs) and hydrocolloids with emulsifying properties.

U.S. Pat. No. 6,203,841 to Lynch and assigned to the same assignee as the instant invention provides a whippable food product comprising a triglyceride fat component having a first fraction of a triglyceride fat having an iodine value of less than 5 and a second hardening fat component. The hardening fat component is used at levels of 2-10%.

U.S. Pat. No. 5,962,058 to Ono provides a whippable product wherein the fat component is a blend of diglycerides and triglycerides.

WO 01/41586 to Sikking and U.S. Pat. No. 6,228,417 to Hidaka describes a whippable product comprising transesterified triglycerides. Transesterification is an extensive and complicated process and is known to add significant cost to manufacturing of these products.

U.S. Pat. No. 4,107,343 to Petricca describes a pourable, whippable emulsion having a specific emulsifier combination, which can be used as a food topping and has long-term stability to separation and gelation. Each of these patents/patent applications allude to the difficulty of making a whippable product that can be distributed, stored, prepared and/or displayed at the normal range of ambient temperatures and maintain a desirable organoleptic profile.

Further, U.S. Pat. No. 6,203,841 to Lynch and WO 01/41586 to Sikking both describe that product performance and/or taste were adversely affected in formulations having greater than 10% of hardening fat.

Accordingly, there is an ongoing and unmet need for whippable products having desirable organoleptic characteristics and superior stability at ambient temperatures.

SUMMARY OF THE INVENTION

The present invention provides a whippable oil in water emulsion food product which can be prepared from readily available ingredients and which extends the distribution and use temperatures for the unwhipped as well as the whipped products.

The whippable food product of the present invention has good organoleptic and stability characteristics. The product can be stored at −20° C. to 40° C. The time for storage varies with the temperature. For example, at 30° C., the product can be stored for up to 12 months and at 40° C., the product can be stored up to 3 months. The product can be whipped from about 10° C. to about 27° C. and used or displayed at up to 30° C. to obtain confections including icings, toppings, fillings and the like on various food products such as cakes, desserts etc. In its whipped form the product is stable for up to 7 days.

The whippable food product of the present invention comprises an oil in water emulsion of a triglyceride component, water, emulsifier component in an amount sufficient to stabilize the product, and optionally a protein component, one or more sugars, sugar alcohols, hydrocolloids, salts, buffers, anti-oxidants or flavors etc.

The HLB ratio of stabilizing to destabilizing emulsifiers for the present invention is between about 1 to 4. The hydrophilic/lipophilic properties of emulsifiers are affected by the structure of the molecule. These properties are identified by the hydrophilic/lipophilic balance (HLB) value. Low HLB values indicate greater lipophilic tendencies which are used to stabilize water-in-oil emulsions. High HLB values are assigned to hydrophilic emulsifiers, typically used in oil-in-water emulsions.

The triglyceride component comprises fat from more than one fraction. For example, a first fraction comprises fat which has a low iodine value. The iodine value is below 5, preferably lower than 2 and more preferably about 1 or lower. Fats in this group include palm kernel oil, coconut oil, babassu oil, tucum oil or hydrogenated fractions thereof. The first fraction is present in an amount between 80-90% of the total fat. The second fraction of fat comprises a hardening fat. Examples of hardening fat include palm oil, cottonseed oil, lard, tallow, or a stearine fraction thereof. The second fraction (hardening fat fraction) is present in an amount between 10 to 20% of the total fat.

This invention also provides a method for obtaining a whippable food product having improved stability characteristics. The method comprises the steps of blending the dry ingredients and some emulsifiers in an aqueous solution in warm water. A fat phase is prepared by heating the fat and adding remaining emulsifiers to the fat phase. The oil and aqueous phases are mixed and blended. The product is heated to provide a commercially sterile product and then homogenized and further cooled to achieve desired stability.

The present invention also provides a method for obtaining a whipped confection. The product can be whipped by routine methods known in the art to form a whipped confection. The whippable product may be whipped with or without additional ingredients such as various forms of sugars. The product can be whipped to an overrun of up to about 500% at temperatures up to 27° C.

DETAILED DESCRIPTION OF THE INVENTION

This invention provides a whippable food product having improved stability of the unwhipped product (such as with respect to emulsion breakdown, gelation or inversion) as well as of the whipped confection produced therefrom (such as with respect to cracking, weeping, bulging, sagging or sliding off a cake, or detectable loss of organoleptic characteristics). The food product of the present invention can be easily stored and whipped at ambient temperatures.

This invention provides in particular for certain whipped products and confections having longer stability and desirable organoleptic characteristics. Although not intending to be bound by any particular theory, it is believed that the particular combinations of the ingredients including triglyceride fats, and the ratio of stabilizing and destabilizing emulsifiers contribute to the substantial performance improvements as described herein.

Emulsifiers have specific roles in topping applications. In the liquid phase stabilizing ingredients are needed to prevent creaming and inversion. When the product is prepared (whipped), destabilizing ingredients are needed to displace the protein from the oil globule and allow a stable foam/topping to be formed from an oil in water emulsion. Therefore the right proportion is critical to a stable final product. In the present invention, by understanding and controlling the liquid-crystalline phase of the emulsifiers, we have been able to broaden the temperature range that the invention functions. Maintaining the right mix of emulsion stabilizer and destabilizers keeps the specific liquid-crystalline phase that gives consistent emulsion and foam performance at the temperatures disclosed herein.

Stabilizer (or stabilizing) emulsifiers are agents which inhibit agglomeration, creaming and/or coalescence. Destabilizer (or destabilizing) emulsifiers are agents which promote agglomeration. A characteristic feature of this whippable product is that the stabilizer to destabilizer HLB ratio is between 1 to 4. Non-limiting examples of destabilizer and stabilizer emulsifiers are provided below in Table 1.

TABLE 1

| EMULSIFIER | FUNCTION | HLB |
|---|---|---|
| Unsaturated Mono & Diglycerides | Destabilizer | 3-4 |
| Propylene Glycol Esters | Destabilizer | 3.5 |
| Sorbitan Monostearate | Destabilizer | 4.7 |
| Polysorbate 65 | Destabilizer | 11.0 |
| Polysorbate 60 | Destabilizer | 14.5 |
| Polysorbate 80 | Destabilizer | 15.0 |
| Lecithin | Destabilizer | 4-9 |
| Polyglycerol Esters of Fatty Acids | Stabilizer | 7.0 |
| Saturated Mono & Diglycerides | Stabilizer | 3-4 |
| Cellulose Gums | Stabilizer | 10-11 |
| Sucrose Esters | Stabilizer | 11-15 |
| Sodium Stearoyl Lactylate | Stabilizer/Destabilizer* | 21.0 |

*Functions as both but weighted 2:1 as stabilizer/destabilizer in calculations of patent HLB ratios.

The term "stabilizer to destabilizer HLB ratio" as used herein refers to the ratio of the weighted HLB values of stabilizers to the weighted HLB values of destabilizer. Thus, if a formulation has a destabilizer (DS-1) with an HLB of 14.5, present at a concentration of 0.1%, and two stabilizers (S-1 and S-2) with HLB values of 4 and 15 respectively, present at concentrations of 0.1 and 0.3% respectively, the Stabilizer to Destabilizer HLB ratio is calculated as follows. The relative HLB value for DS-1 is the amount of DS-1 times HLB/total amount of emulsifiers (i.e., 0.1×14.5/0.5), which equals 2.9. The relative HLB values for S-1 and S-2 in this example, calculated in a similar manner are 0.8 and 9.0 respectively. Thus, the Stabilizer to Destabilizer HLB ratio is the total relative HLB value for all the stabilizers to the total relative HLB value for the destabilizers. In this example, therefore, this ratio is 3.37.

Representative characteristics and specific improvements (and combinations of improvements) for whipped food products and confections that are achieved according to the practice of the invention include:

a) unwhipped liquid product is easily pourable b) the product may be whipped with or without additional ingredients such as sugar, powdered sugar, liquid sugar and the like.

c) the unwhipped product can be stored from −20° C. to 40° C. The time for storage varies with the temperature. For example, at 30° C., it can be stored for up to 12 months and at 40° C. it can be stored for at least up to 3 months.

d) the whipped product is a dessert whipped topping, icing or filling with desirable taste and mouth characteristics.

e) the whipped product can be prepared from 10° C. to 27° C.

f) the whipped product can be used/displayed at temperatures up to 30° C. as a topping, icing or filling for cakes, desserts etc. for up to 7 days without any appreciable cracking, weeping, bulging, sagging or sliding off the cake or dessert.

g) it can be whipped to an overrun of up to 500%. Generally the overrun obtained is between 150 to 500%. Overrun (%) is defined as the liquid weight/volume divided by foam weight/volume×100.

h) The water activity is less than or equal to 0.93.

i) the whippable product has a stabilizer to destabilizers HLB ratio of 1 to 4.

The various ingredients of this product are provided below.

Fats

The triglyceride fat component contributes to the stability of the product. In one embodiment, the fats useful for the present invention are a blend of two fractions. The first fraction has a low iodine number and includes fats such as palm kernel oil (PKO), coconut oil, babassu oil, tucum oil and hydrogenated fractions thereof. Generally tropical or lauric fats are suitable examples of fats in the first fraction. The iodine value of this fraction is 5 or lower, preferably 2 or lower and more preferably around 1 or lower. It is preferred to have fully hydrogenated fats which would typically have an iodine value of lower than 3. As an example, the iodine value of fully hydrogenated PKO is ≦1.0.

A second fraction comprises a hardening fat. Examples of fats in the second fraction are palm oil, cottonseed oil, lard, tallow or a stearine fraction of any of the above. In one embodiment, the triglyceride fat component is a blend of hydrogenated palm kernel oil and palm oil stearine.

Although not intending to be bound by any particular theory, it is believed that the second fraction contributes to the stability of the whippable product at ambient temperatures without detracting substantially from the organoleptic properties of the first fraction. The first fraction makes up between 80-90% of the total fat with the remaining being made by the second fraction. In different embodiments of the invention, the triglyceride fat component may be made up of first fraction of 80%, 81%, 82%, 83%, 84%, 85%, 86%, 87%, 88%, 89% and 90% with the remaining fat component being made by the second fraction.

The solid fat content (AOCS Official Method cd 16b-93, 1993) and the fatty acid profile (AOCS Official Method Ce 1-62, 1990) of the whippable product from the present invention were determined according to the standard AOCS methods and are presented below in Table 2.

TABLE 2

|  | Hydrogenated Palm Kernel with 10% Palm Stearine | Hydrogenated Palm Kernel with 20% Palm Stearine |
| --- | --- | --- |
| SFC % at Temperature ° C. | | |
| 10 | 93 | 93 |
| 20 | 79 | 82 |
| 25 | 68 | 74 |
| 30 | 39 | 50 |
| 35 | 20 | 31 |
| 40 | 15 | 26 |
| Fatty Acid Profile | | |
| % C8 | 2.9 | 2.6 |
| % C10 | 2.9 | 2.6 |
| % C12 | 41.5 | 37.9 |
| % C14 | 13.9 | 12.9 |
| Total % C14 and less | 61.2 | 56.0 |

Emulsifiers

A wide variety of emulsifiers may be employed in amounts on the same order as in the prior art oil-in-water emulsions, for example, about from 0.1% to 3%, preferably about from 0.4% to 1.0% as permissible under FDA guidelines. Suitable emulsifiers include lecithin, hydrolyzed lecithin; mono, di, or polyglycerides of fatty acids, such as stearine and palmitin mono and diglycerides, polyoxyethylene ethers of fatty esters of polyhydric alcohols, such as the polyoxyethylene ethers of sorbitan monostearate (Polysorbate 60) or the polyoxyethylene ethers of sorbitan monooleate (Polysorbate 80); fatty esters of polyhydric alcohols such as sorbitan monostearate or tristearate; polyglycerol esters of mono and diglycerides such as hexaglyceryl distearate; mono- and/or diesters of glycols such as propylene glycol monostearate, and propylene glycol monopahnitate, succinoylated monoglycerides; and the esters of carboxylic acids such as lactic, citric, and tartaric acids with the mono- and diglycerides of fatty acids such as glycerol lacto palmitate and glycerol lacto stearate, and calcium or sodium stearoyl lactylates and all members of the sucrose ester family thereof, all varieties of diacetyltartaric esters of fatty acids, "DATEMS", and the like, and mixtures thereof.

The emulsifier component of the present invention may also include one or more hydrophilic colloids as stabilizing emulsifiers. These include methylcellulose, carboxy-methylcellulose, hydroxy-propylcellulose, hydroxy-propylmethylcellulose, and microcrystalline cellulose. The HLB values for these hydrophilic colloids are presented in Table 1 under cellulose gums.

As discussed above, the emulsifiers should be selected so that the stabilizer to destabilizer HLB ratio is between 1 and 4.

Thickeners/Gelling Agents

Some gums and starches are useful as thickeners/gelling agents. Those skilled in the art will recognize that these thickeners/gelling may also act as stabilizers and emulsifiers. However, in the present invention, if present in the formulation, these gums have not been included in the calculation of HLB values. These gums could be natural such as plant gums or animal gums. Examples of such gums include gelatins, pectins, alginates, agars, carrageenans, locust beans, guars, acacias, xanthans, karayas, gellans and konjac gums. Starches include corn, potato, wheat, tapioca, rice and any derivatives or modifications thereof. Typically, a gum/starch or combination of gums/starches is employed with a sugar, e.g. dextrose, carrier. The amount of these gums/starches can be varied widely in accordance with the amounts known in prior art compositions, generally about from 0-2%, preferably about 0.1-0.5% as permissible under FDA guidelines.

Proteins

Optionally proteins can be included in the formulation. Milk proteins such as isolated sodium, potassium or calcium caseinates, protein provided as skim milk, nonfat dry milk, milk protein concentrate, whey protein concentrates, ovalbumin, alpha lactalbumin and beta lactoglobulin can be used. The proteins are generally known to assist in the emulsification and stability of the whipped products. Vegetable proteins including but not limited to soya protein, pea protein, wheat protein, cottonseed protein, peanut protein, and corn protein are also useful. Meat proteins derived as soluble proteins from meat processing may also be used according to the practice of the invention. Egg white may also be used.

Sugars

The sugars (or sweeteners) useful for the present invention include monosaccharides, disaccharides, polysaccharides, dextrins, maltodextrins and polyols. The sugars may be reducing or non-reducing sugars. The sugar component may comprise one or more sugars, such as sucrose, fructose, dextrose, trehalose, and/or sugar syrups, such as corn syrups, and/or intensive sweeteners, such as acesulfame, thaumatin aspartame, alitame, saccharin, cyclamates, and trichloro sucrose. Other typical sweetener/bulking agents include maltodextrin and polyols such as: polydextrose, maltitol, erythritol, xylitol, mannitol, isomalt, lactitol, glycerin, propylene glycol and sorbitol. For formulation calculations, all of these materials are considered to be included in the sweetener component. For taste purposes and for ease of operation, the sweetener component normally comprises sucrose or sucrose-sorbitol combinations.

Salts

The salts useful for the present invention are any edible salts that do not interfere with other ingredients or render an undesirable taste. Salts generally act as buffers and sequestrants. Sequestrants are considered to combine with polyvalent metal ions to form soluble metal complexes that improve the quality and stability of foods and food emulsions. Examples of useful salts are common salt (sodium chloride), and sodium, calcium and potassium: monophosphates, diphosphates, polyphosphates, citrates, chlorides, and the like.

Acidulants

Acidulants can be added to control pH, serve as a preservative and/or to attenuate sweetness, flavor and/or browning. Examples of acidulants suitable for the present invention are phosphoric, tartaric, malic, citric, gluconic, fumaric, and the like. It is preferable to use acidulants so as to maintain a pH range of between 4 to 8.

Other Ingredients

Other ingredients that are useful for the present invention include flavoring agents, colorants, vitamins, minerals milk powder, cream powder etc. Suitable flavoring agents can be employed to impart vanilla, cream, chocolate, coffee, maple, spice, mint, butter, caramel, fruit and other flavors.

The range of total fats in the present product is 12-48%, preferably between 20-30%. The total sugars solids are between 20-60%, preferably between 20-40%. The water is between 25-60% preferably between 35-55%. The proteins are optional and can be added up to 5%, preferably between 0.5 to 2.5%. Various flavors can be added to the product with the range depending upon the required flavor profile.

The following table (Table 3) provides the ranges of various ingredients of the whippable product according to the present invention.

TABLE 3

| Ingredient | Range | Preferred |
|---|---|---|
| Water | 25% to 60% | 30% to 50% |
| Gums | 0.1% to 2% | 0.2% to 0.6% |
| Proteins | 0 to 5% | 0.5% to 2.5% |
| Salts | 0.1% to 1% | 0.1% to 0.5% |
| Preservatives | 0.10 to 2% | 0.1% to 0.5% |
| Emulsifiers | 0.1 to 3% | 0.4% to 1.0% |
| Flavors | 0.01% to 1% | 0.1% to 0.5% |
| Fraction 1 | 10% to 40% | 20% to 30% |
| Fraction 2 | 2% to 8% | 2.0% to 6% |
| Sugars | 20%-60% | 20% to 40% |

To prepare the product, the dry ingredients (via premix including hydrophilic emulsifiers (HLB $\geq 6$)) are added to the hot water (at about 75° C.). Sugars or sugar solutions are then added to the aqueous phase and the temperature is allowed to equilibrate to about 75° C. allowing the ingredients time to dissolve and mix. The fat phase (~65° C.) is added along with the lipophilic emulsifiers (HLB<6) and mixed at high speed until a homogenous mixture is formed. The resulting mixture is processed to achieve a desired level of microbial destruction so as to produce a sterile product. In the present invention, the product was processed to achieve a $F_0$ of 10 to 15 (see Canned Foods by Gavin and Weddig National Food Processors Association, $5^{th}$ Edition, 1995). This can be achieved, for example, by preheating to 75° C.-85° C. followed by heating the product to 140° to 145° C. by either indirect or direct heating methods for a hold time 4 to 10 seconds.

The mixture is then flash cooled to achieve a temperature of 75° C.-85° C., (temperatures <60° C. or >90° C. are known to increase the particle size distribution of the final emulsion), homogenized using a two stage homogenizer to a pressure of 100 to 1000 bar (preferably 200 to 600 bar) and then pre-cooled to 30° C.-60 C, preferably to 40° C. to 50° C. with a final cool to 5° C. to 20° C., preferably to 5° C. 15° C. It was observed that pre-cool temperatures of <30° C. or >60° C. or final cool temperatures >20° C. result in reduced performance quality. The resultant mixture is then filled aseptically. The samples are preferably tempered at 5° C. to 15° C. for 24-96 hours (temperatures >20° C. are known to decrease the stability of the final emulsion) to achieve desired ingredient hydration and fat structure. The tempered product can be used or stored and/or distributed at freezer, refrigeration or ambient temperatures.

The whippable product produced according to the above method can be stored and distributed up to 12 months at from about −20° C. to about 30° C. If stored frozen the product can be thawed by any routine process used in the art.

To obtain a whipped confection, the whippable product of the present invention can be whipped using a paddle, whip, traditional batch mixers (Hobart, Kitchen Aid, Kenwood etc), aeration devices including continuous mixers and the like.

The whippable product can be whipped to an overrun of up to 500%. Typically the overrun is about 150 to 500%. While temperature plays a role in the final overrun, the product can be whipped in about 4-15 minutes at temperatures between refrigeration temperature (about 4° C.) and room temperature (about 27° C.). The whipped product is stable at ambient temperatures for up to 7 days without loss of acceptability.

A variety of whipped confections can be made from the product of this invention. Such confections include fillings, icings, toppings, decorations and the like which can be used for cakes, pies, cookies and the like. The toppings, icings and fillings are used according to routine methods. Further, the whipped product of the present invention may be used with other components to provide for desired toppings, icings or fillings. Recipes for such additional applications can be found in Examples 16-23 of U.S. Pat. No. 6,203,841.

The following non-limiting examples are provided to further illustrate the invention and are not intended to be construed as restrictive in any way.

EXAMPLE 1

This embodiment provides one example each of a formulation according to the present invention for an icing and a topping (Table 4).

TABLE 4

|  | Icing % | Topping % |
| --- | --- | --- |
| Water | 32 | 50 |
| Palm Kernel Oil | 22.5 | 23.4 |
| Palm Stearine | 2.5 | 2.6 |
| Sucrose | 35.0 | 20.0 |
| Sorbitol | 5.0 | 1.0 |
| Sodium Caseinate | 1.50 | 1.50 |
| Whey Isolate | 0.00 | 0.50 |
| Methocellulose | 0.17 | 0.15 |
| Xanthan Gum | 0.03 | 0.05 |
| Carrageenan | 0.05 | 0.07 |
| Polysorbate 60 | 0.20 | 0.10 |
| Polysorbate 80 | 0.00 | 0.02 |
| Sucrose Ester | 0.23 | 0.25 |
| Sodium Stearoyl Lactylate | 0.20 | 0.20 |
| Monoglycerides | 0.10 | 0.10 |
| Salt | 0.15 | 0.15 |
| Sodium Phosphate | 0.25 | 0.25 |
| Vanilla | 0.10 | 0.10 |
| Potassium Sorbate | 0.10 | 0.10 |
| TOTAL | 100 | 100 |
| Destabilizing Relative HLB | 3.9 | 3.1 |
| Stabilizing Relative HLB | 7.6 | 8.3 |
| HLB Ratio | 2.0 | 2.7 |

EXAMPLE 2

This embodiment demonstrates that different sugars can be used in the formulations of the present invention. Two formulations comprising either erythritol or sorbitol are presented in Table 5.

TABLE 5

| Ingredient | Formulation 2A (%) | Formulation 2B (%) |
| --- | --- | --- |
| Water | 38.7 | 28.99 |
| Sodium Caseinate | 1.5 | 1.5 |
| Microcrystalline cellulose | 0.3 | 0.0 |
| Xanthan | 0.03 | 0.03 |
| Methocellulose | 0.18 | 0.18 |
| Salt | 0.15 | 0.15 |
| Potassium sorbate | 0.1 | 0.1 |
| Potassium phosphate | 0.25 | 0.25 |
| Vanilla flavor | 0.1 | 0.1 |
| SSL | 0.2 | 0.2 |
| Distilled Monoglycerides | 0.1 | 0.2 |
| Polysorbate 60 | 0.1 | 0.1 |
| Sucrose ester | 0.2 | 0.2 |
| Palm kernel oil | 21.25 | 21.25 |
| Palm oil | 3.75 | 3.75 |
| Erythritol | 13 | 0.0 |
| Sorbitol | 0.0 | 8 |
| Sugar | 20 | 35 |
| TOTAL | 100 | 100 |
| Destabilizing Relative HLB | 2.2 | 2.6 |
| Stabilizing relative HLB | 8.7 | 7.7 |
| HLB Ratio | 3.9 | 2.9 |

EXAMPLE 3

In this example, an icing composition (Formulation 3A) according to the present invention was compared with icing composition outside of the present invention (Formulations 3B and 3C). The formulations are shown in Table 6.

TABLE 6

|  | Formulation 3A | Formulation 3B | Formulation 3C |
| --- | --- | --- | --- |
| Water | 32% | 22% | 21% |
| Palm Kernel Oil | 22% | 24.5% | 25% |
| Palm Oil | 3% | 0.5% | 0% |
| Sucrose | 35% | 0% | 0% |
| High Fructose Corn Syrup | 0% | 50% | 50% |
| Sorbitol | 5% | 0% | 0% |
| Dextrose | 0% | 0% | 0% |
| Sodium Caseinate | 1.5% | 1% | 2% |
| Cellulose Gums | 0.2% | 0.4% | 0.3% |
| Xanthan, Carrageenan* | 0.12% | 0.05% | 0.05% |
| P60, P80, SSL, PGE, Sucrose Esters, Mono & Diglycerides, Lecithin** | 0.8% | 0.4% | 0.5% |
| Sodium Phosphate, sodium chloride*** | 0.4% | 0.15% | 0.15% |
| Flavor | 0.2% | 0.5% | 0.5% |
| TOTAL | 100 | 100 | 100 |
| Destabilizing Relative HLB | 2.6 | 2.3 | 6.0 |
| Stabilizing Relative HLB | 8.0 | 8.2 | 4.0 |

TABLE 6-continued

|  | Formulation 3A | Formulation 3B | Formulation 3C |
|---|---|---|---|
| Stabilizer/Destabilizer HLB Ratio | 3.1 | 3.5 | 0.7 |

*Formulation 3A had Xanthan and Carageenan while Formulations 3B and 3C had Xanthan only.
**Formulation 3A had P60, P80, SSL, Sucrose Ester, Mono and Diglycerides while Formulations 3B had only SSL and 3C had P60, PGE and Lecithin.
***Formulation 3A had sodium phosphate and sodium chloride while Formulations 3B and 3C had sodium chloride only.

The performance characteristics of these formulations were tested up to 4 days as follows. The product was whipped for 6 to 12 minutes and its display characteristics were scored. The display measures assessed were: application to a cake, storage in a bowl and performance using a pastry bag. The results are presented in Tables 7A-7C. NW indicates that the composition did not whip.

TABLE 7A

| Sample | Formulation 3A | | | |
|---|---|---|---|---|
| Parameter Whip Temp (° C.) | Overrun % | Display 22° C. | Display 25.5° C. # Days stable | Display 30° C. |
| 10 | 320 | 4 | 4 | 1 |
| 21 | 300 | 4 | 4 | 1 |
| 24 | 280 | 4 | 4 | 1 |
| 27 | 250 | 4 | 4 | 1 |

TABLE 7B

| Sample | Formulation 3B | | | |
|---|---|---|---|---|
| Parameter Whip Temp (° C.) | Overrun % | Display 22° C. | Display 25.5° C. # Days stable | Display 30° C. |
| 10 | 380 | 4 | 0 | 0 |
| 27 | 250 | 1 | 0 | 0 |

TABLE 7C

| Sample | Formulation 3C | | | |
|---|---|---|---|---|
| Parameter Whip Temp (° C.) | Overrun % | Display 22° C. | Display 25.5° C. # Days stable | Display 30° C. |
| 10 | 290 | 0 | 0 | 0 |
| 27 | NW | 0 | 0 | 0 |

EXAMPLE 4

In this example, a topping composition according to the present invention (Formulation 4A) was compared to compositions outside of the invention (Formulations 4B and 4C). These formulations are presented below in Table 8.

TABLE 8

|  | Formulation | | |
|---|---|---|---|
| Ingredient | Formulation 4A | Formulation 4B | Formulation 4C |
| Water | 50% | 43% | 44% |
| Palm Kernel Oil | 22.5% | 24.5% | 25% |
| Palm Oil | 2.5% | 0.5% | 0% |
| Sucrose | 20% | 0% | 0% |
| High Fructose Corn Syrup | 0% | 30% | 30% |
| Sorbitol | 2% | 0% | 0% |
| Sodium Caseinate | 1.5% | 1% | 0% |
| Methocellulose | 0.20% | 0.25% | 0.25% |
| Xanthan, Carrageenan Alginate* | 0.10% | 0.05% | 0.05% |
| P60, SSL, PGE, Sucrose Esters, Mono & Diglycerides, Lecithin** | 0.80% | 0.50% | 0.20% |
| Sodium Phosphate, Sodium Chloride*** | 0.30% | 0.20% | 0.10% |
| Vanilla and Cream Flavors | 0.25% | 0.25% | 000.25% |
| TOTAL | 100 | 100 | 100 |
| Destabilizing Relative HLB | 2.6 | 2.8 | 5.4 |
| Stabilizing Relative HLB | 8.0 | 7.7 | 6.0 |
| Stabilizing/ Destabilizing Emulsifier Ratio | 3.1 | 2.7 | 1.1 |

*Formulation 4A had Xanthan and Carrageenan. Formulations 4C and 4B had respectively only Alginate and Xanthan.
**Formulation 4A had P60, P80, SSL, Sucrose Ester, Mono and Diglycerides while Formulations 4B had only SSL and 4C had P60, PGE and Lecithin.
***Formulation 4A had sodium phosphate and sodium chloride while Formulations 4B and 4C had sodium chloride only.

The performance characteristics of the formulations from Example 2 were tested up to 4 days as described in Example 3. The results are presented below in Tables 9A-9C.

TABLE 9A

| Sample | Formulation 4A | | | |
|---|---|---|---|---|
| Parameter Whip Temp (° C.) | Overrun % | Display 7° C. | Display 22° C. # Days stable | Display 25.5° C. |
| 10 | 430 | 4 | 4 | 1 |
| 21 | 380 | 4 | 4 | 1 |
| 24 | 330 | 4 | 4 | 1 |
| 27 | 270 | 4 | 4 | 1 |

TABLE 9B

| Sample | Formulation 4B | | | |
|---|---|---|---|---|
| Parameter Whip Temp (° C.) | Overrun % | Display 7° C. | Display 22° C. # Days stable | Display 25.5° C. |
| 10 | 450 | 4 | 1 | 0 |
| 27 | NW | 0 | 0 | 0 |

TABLE 9C

| Sample | Formulation 4C | | | |
|---|---|---|---|---|
| Parameter Whip Temp (° C.) | Overrun % | Display 7° C. | Display 22° C. # Days stable | Display 25.5° C. |
| 10 | 370 | 1 | 0 | 0 |
| 27 | NW | 0 | 0 | 0 |

EXAMPLE 5

This example further emphasizes the importance of Stabilizing to Destabilizing emulsifier ratios by comparing some stability characteristics of formulations according to the present invention with some formulations outside of the scope of the invention. Various formulations were prepared as presented in Table 10. In addition to the ingredients shown, all the formulations have similar sweeteners, proteins, sodium phosphate, salt, vanilla and sorbate.

Formulations A and B are identical, C, D and E are identical, F and G are identical, H and I are identical and J and K are identical. Formulations A, B, C, D and E were prepared according to the present invention. However, Formulations F, G, H, I, J and K do not fall within the scope of the present invention. Formulations F and G comprise Palm kernel stearine as the second fraction. The Stabilizer to Destabilizer HLB ratio is below 1 for Formulations F, G, J and K, and above 4 for Formulations H and I. Formulations A, C, F, H and J were whipped at 10° C., formulations B, D, G, I and K were whipped at 21° C. and Formulation E was whipped at 25.5° C.

The formulations were tested according to the guidelines of Sensory Evaluation Techniques by Meilgaard et al. (2$^{nd}$ Edition, 1999, CRC Press). The various characteristics tested included Peaking, Penetrometer, Percent Creaming, Pastry Bag time, ease of slicing, air cell coalescence and visual appearance. All attributes were graded on a scale of 1-5. The testers were not aware of the identity of the formulations they were testing.

Whip time refers to the time required to fully aerate and set the texture of topping or icing without inverting or churning the product.

Peaking refers to the texture of the product immediately after whipping. The whipped product is scooped up with a spoon and the spoon is held vertical for 30 seconds. A desirable peaking is a soft peak whose tip is curled down.

Penetrometer refers to the depth of penetration (mm) into a whipped toping or icing by conical probe with a load of 150 grams in 10 seconds.

Pastry Bag time refers to the time a whipped product is useable (with respect to appearance and effort) out of a plastic or cloth bag with a standard rosette pastry tip.

Firmness refers to the mouth feel when the whipped product is compressed in mouth with between tongue and roof of the mouth.

Spreadability refers to the ease of spreading on a cake and evenness of the spread product.

Percent creaming refers to the percentage by volume of aqueous serum to fat layers at a specified storage interval and temperature.

Air cell coalescence refers to the change in appearance of the topping or icing from fine grain texture to coarse pockmarked texture as small air cells combine into larger cells.

The results in Table 10 indicate that the formulations of the present invention (A-E) have superior stability with respect to use and display. The values in bold indicate variance from the optimal value or range.

It will be recognized by those skilled in the art that based on the disclosure provided herein, routine modifications to the various embodiments are possible which are intended to be within the scope of the present invention.

TABLE 10

| Ingredient | Formulation | | | | | | | | | | |
|---|---|---|---|---|---|---|---|---|---|---|---|
|  | A | B | C | D | E | F | G | H | I | J | K |
| Fraction 2 Fat | Palm Stearine | Palm Stearine | Palm Stearine | Palm Stearine | Palm Stearine | Palm Kernel Stearine | Palm Kernel Stearine | Palm Stearine | Palm Stearine | Palm Stearine | Palm Stearine |
| Total fat | 26 | 26 | 26 | 26 | 26 | 26 | 26 | 26 | 26 | 26 | 26 |
| % of Fat that equals Fraction 2 | 10 | 10 | 15 | 15 | 15 | 10 | 10 | 10 | 10 | 10 | 10 |
| Stabilizing to Destabilizing HLB Ratio | 2.08 | 2.08 | 2.15 | 2.15 | 2.15 | 0.7 | 0.7 | 4.57 | 4.57 | 0.86 | 0.86 |
| Whip temp | 50 | 70 | 50 | 70 | 78 | 50 | 70 | 50 | 70 | 50 | 70 |
| PKO 1 IV | 23.4 | 23.4 | 22.1 | 22.1 | 22.1 | 23.4 | 23.4 | 23.4 | 23.4 | 23.4 | 23.4 |
| Hard fraction fat | 2.6 | 2.6 | 3.9 | 3.9 | 3.9 | 0 | 0 | 2.6 | 2.6 | 2.6 | 2.6 |
| Soft fraction fat | 0 | 0 | 0 | 0 | 0 | 2.6 | 2.6 | 0 | 0 | 0 | 0 |
| Storage temp | 45 | 72 | 45 | 86 | 86 | 45 | 72 | 45 | 72 | 45 | 72 |
| % Overrun | 378 | 326 | 495 | 371 | 330 | 298 | 210 | 286 | 254 | 422 | 290 |
| Whip time (minutes) | 14.75 | 8.5 | 15.1 | 10.75 | 5.25 | 10 | 30 | 11.9 | 6.75 | 10.75 | 5.5 |
| Peaking (optimal 2.5–3.5) | 3 | 3 | 3.5 | 3.5 | 3.5 | 4 | 1 | 4 | 4 | 3.5 | 3.5 |
| Firmness (optimal 2.5–3.5) | 3 | 2.5 | 2.5 | 3.5 | 3 | 3.5 | 1 | 4 | 4 | 3 | 3.5 |
| Spreadability (optimal 2.5–3.5) | 3 | 3 | 3 | 3 | 3 | 3.5 | 5 | 3.5 | 4 | 3 | 4 |
| Penetrometer (optimal 32–42) | 35.3 | 33 | 41.4 | 33 | 42 | 27.5 | >60 | 26 | 30.4 | 36 | 32.9 |
| % Creaming (optimal <5) | 0 | 0 | 0 | 0 | 0 | 7 | 33 | 11 | 22 | 23 | 23 |
| Pastry Bag (optimal >45 min) Minutes product remained unchanged | 90 | 90 | 60 | 75 | 90 | 0 | 0 | 15 | 15 | 45 | 15 |

TABLE 10-continued

| Ingredient | Formulation | | | | | | | | | | |
|---|---|---|---|---|---|---|---|---|---|---|---|
| | A | B | C | D | E | F | G | H | I | J | K |
| Iced Cake (Optimal 1) | | | | | | | | | | | |
| Rough surface | 1 | 1 | 1.5 | 1 | 1.5 | 3.5 | * | 3 | 3 | 1.5 | 1.5 |
| Air cell coalescence | 1 | 1 | 1 | 1 | 1 | 2 | * | 2 | 3 | 2 | 1.5 |
| Iced Cake Stored 45 F. (optimal <2 @ 4 days) | | | | | | | | | | | |
| Ease of slicing 1 day | 1 | 1 | 1 | 1 | 1 | 4 | * | 3 | 2 | 1 | 1 |
| Air cell coalescence 1 day | 1 | 1 | 1.5 | 1 | 1 | 3.5 | * | 4 | 3.5 | 2 | 1 |
| Air cell coalescence 4 days | 1 | 1 | 1.5 | 1 | 1 | 3.5 | * | 4 | 4 | 4 | 1 |
| Iced Cake Stored 72 F. (optimal <2 @ 4 days) | | | | | | | | | | | |
| Rough surface 1 day | 1 | 1 | 1.5 | 1 | 1.5 | 5 | * | 3 | 3 | 1.5 | 1 |
| Ease of slicing 1 day | 1 | 1 | 1 | 1 | 1 | 3 | * | 3 | 2 | 3 | 1 |
| Air cell coalescence 1 day | 1 | 1 | 1.5 | 1 | 1 | 3.5 | * | 4 | 3 | 3 | 1.5 |
| Rough surface 4 day | 1 | 1 | 1.5 | 1 | 1.5 | 5 | * | 3 | 3 | 1.5 | 1 |
| Ease of slicing 4 day | 1.5 | 1.5 | 1 | 1 | 1 | 4 | * | 5 | 3 | 5 | 3 |
| Air cell coalescence 4 day | 1 | 1.5 | 1.5 | 1.5 | 1.5 | 3.5 | * | 5 | 4 | 5 | 5 |
| Bowl Stored 45 F. (optimal <2 @ 4 days) | | | | | | | | | | | |
| Air cell coalescence in bowl 1 day | 1 | 1 | 1 | 1 | 1 | 2 | * | 4 | 3.5 | 3.5 | 1.5 |
| Air cell coalescence in bowl 4 day | 1.5 | 2 | 1 | 1 | 1 | 2 | * | 5 | 4 | 4 | 2 |

*indicates Not Determined

The invention claimed is:

1. A whippable oil-in-water emulsion food product comprising triglyceride fat comprising a first fraction of vegetable oil having an iodine value of 5 or less and a second fraction of hardening fat, wherein the first fraction makes up 80-90% of the triglyceride fat; an emulsifier component comprising stabilizing and destabilizing emulsifiers such that the stabilizer to destabilizer HLB ratio is between 1 and 4; and one or more sugars,
wherein the whippable product can be stored and whipped at ambient temperatures and the whipped product prepared from the whippable product can be displayed at ambient temperatures and wherein the triglyceride fat has a profile of solid fat content of about 93 at 10° C., about 79-82 at 20° C., about 68 to 74 at 25° C., 39-50 at 30° C., 20-31 at 35° C., and 15-26 at 40° C.

2. The whippable food product of claim 1, wherein the percent of first fraction of total fat is selected from the group consisting of 80%, 81%, 82%, 83%, 84%, 85%, 86%, 87%, 88%, 89% and 90%.

3. The whippable food product of claim 1, wherein the first fraction makes up 88% of the total triglyceride fat.

4. The whippable food product of claim 1, wherein the first fraction makes up about 80% of the total triglyceride fat.

5. The whippable food product of claim 1, wherein the first fraction makes up about 85% of the total triglyceride fat.

6. The whippable food product of claim 1, wherein the first fraction is selected from the group consisting of palm kernel oil, coconut oil, tucum oil, and hydrogenated fractions thereof.

7. The whippable food product of claim 1, wherein the second fraction is selected from the group consisting of palm oil, cottonseed oil, lard, tallow and a stearine fraction thereof.

8. The whippable food product of claim 1, wherein the first fraction is palm kernel oil and the second fraction is palm oil.

9. The whippable food product of claim 8, wherein the palm kernel oil makes up 89% of total fat and palm oil makes up the remaining fat.

10. The whippable food product of claim 8, wherein the palm kernel oil makes up about 80% of total fat and palm oil makes up the remaining fat.

11. The whippable food product of claim 1, further comprising one or more proteins.

12. The whippable food product of claim 11, further comprising flavorings.

13. The whippable food product of claim 1, wherein the sugar is selected from the group consisting of monosaccharides, disaccharides, polysaccharides, maltodextrins, polyols and combinations thereof.

14. The whippable food product of claim 13, wherein the sugar is selected from the group consisting of sucrose, fructose, dextrose, trehalose, sugar syrups, polydextrose, maltitol, erythritol, xylitol, mannitol, isomalt, lactitol, glycerin, propylene glycol and sorbitol.

15. The whippable food product of claim 13, further comprising an intensive sweetener selected from the group consisting of acesulfame, thaumatin aspartame, alitame, saccharin, cyclamates and trichloro sucrose.

16. The whippable food product of claim 1, wherein the fat of the first fraction is fully hydrogenated.

17. The whippable food product of claim 1, wherein the stabilizing emulsifiers are selected from the group consisting of saturated monoglycerides, saturated diglycerides, polyglycerol esters of fatty acids, cellulose gums, sucrose esters and sodium stearoyl lactylate and the destabilizing emulsifiers are selected from the group consisting of unsaturated monoglycerides, unsaturated diglycerides, propylene glycol esters, sorbitan monostearate, polysorbate 65, polysorbate 60 and polysorbate 80, lecithin and sodium stearoyl lactylate.

18. The whippable food product of claim 1, wherein the stabilizer to destabilizer HLB ratio is between 2 and 4.

* * * * *

UNITED STATES PATENT AND TRADEMARK OFFICE
CERTIFICATE OF CORRECTION

| | | |
|---|---|---|
| PATENT NO. | : 7,351,440 B2 | Page 1 of 1 |
| APPLICATION NO. | : 10/843926 | |
| DATED | : April 1, 2008 | |
| INVENTOR(S) | : Perks et al. | |

It is certified that error appears in the above-identified patent and that said Letters Patent is hereby corrected as shown below:

Col. 15 Claim 1, line 48, "at 10° C.," should be -- at 10° C, --

Col. 15 Claim 1, line 49, "at 20° C.," should be -- at 20° C, --

Col. 15 Claim 1, line 49, "at 25° C.," should be -- at 25° C, --

Col. 15 Claim 1, line 50, "at 30° C.," should be -- at 30° C, --

Col. 15 Claim 1, line 50, "at 35° C.," should be -- at 35° C, --

Signed and Sealed this

Twenty-third Day of September, 2008

JON W. DUDAS
*Director of the United States Patent and Trademark Office*